US006941549B1

(12) United States Patent
Holder et al.

(10) Patent No.: US 6,941,549 B1
(45) Date of Patent: Sep. 6, 2005

(54) COMMUNICATING BETWEEN PROGRAMS HAVING DIFFERENT MACHINE CONTEXT ORGANIZATIONS

(75) Inventors: William Alan Holder, Vestal, NY (US); Damian Leo Osisek, Vestal, NY (US); Thomas Michael Vail, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/540,394

(22) Filed: Mar. 31, 2000

(51) Int. Cl.$^7$ .............................................. G06F 9/44
(52) U.S. Cl. ..................................... 717/162; 717/140
(58) Field of Search ............................... 717/138–140, 717/146, 147, 162–167, 153; 709/200, 328, 709/330, 331, 310, 312, 318; 719/330–332, 719/312

(56) References Cited

U.S. PATENT DOCUMENTS

| | | | | |
|---|---|---|---|---|
| 4,961,133 A | * | 10/1990 | Talati et al. | 717/148 |
| 5,027,273 A | * | 6/1991 | Letwin | 713/600 |
| 5,083,262 A | | 1/1992 | Haff, Jr. | 703/27 |
| 5,491,817 A | | 2/1996 | Gopal et al. | 707/200 |
| 5,553,286 A | * | 9/1996 | Lee | 717/162 |
| 5,572,724 A | | 11/1996 | Watanabe et al. | 707/200 |
| 5,581,769 A | | 12/1996 | Wallace et al. | 709/315 |
| 5,598,560 A | * | 1/1997 | Benson | 717/159 |
| 5,649,204 A | | 7/1997 | Pickett | 717/167 |
| 5,774,728 A | * | 6/1998 | Breslau et al. | 717/141 |
| 5,872,956 A | | 2/1999 | Beal et al. | 709/224 |
| 5,887,172 A | * | 3/1999 | Vasudevan et al. | 709/328 |
| 5,920,721 A | * | 7/1999 | Hunter et al. | 717/159 |
| 6,293,712 B1 | * | 9/2001 | Coutant | 717/155 |

OTHER PUBLICATIONS

"System/390 Announcement", IBM U.S. Marketing & Services press release of Sep. 5, 1990; pp., 1-4.*
"Principles of Operation: Enterprise Systems Architecture/390", Eighth Edition, International Business Machines Corporation; 1990-2001; pp. 1-1 to 1-14, 3-43 to 3-54, 5-10 to 5-16.*
"VSE Update 31"; Xephon plc, 1998; pp. 1-64.*
Langevin, Leo J.; "Introduction to 31-Bit Programming"; VSE Tools & Techniques, Technical Support, Aug. 1997; pp. 1-2.*
K. E. Plambeck et al., "Development and Attributes of z/Architecture"; IBM J. Res. & Dev., vol. 46 No. 4/5; Jul./Sep. 2002; pp. 367-379.*
Shannon, R.P., "Zee Guide to z/Architecture"; John Hancock Financial Services, Session 2818; Feb. 26, 2003; pp. 1-46.*
Walter, Oney; "Mix 16-Bit and 32-Bit Code In the Applications With the Win32s Universal Thunk"; Microsoft Systems Journal; Nov. 1993; vol. 8, No. 11, p 39.; pp. 1-19.*
Rogers, J.; "Your Own Endian Engine"; Dr. Dobb's Journal, vol. 20, No. 11, p. 30; 1995; pp. 1-12.*

* cited by examiner

Primary Examiner—Kakali Chaki
Assistant Examiner—William H. Wood
(74) Attorney, Agent, or Firm—Kevin R. Radigan; Arthur J. Samodovitz (57) ABSTRACT

Programs having different machine content organizations communicate with one another. This communication is enabled by a linkage design incorporating program attributes, which allows the savearea layout and linkage services for a program to be selected at compile time. The selection of the savearea layout and linkage services, at compile time, enables the provision of a source code with reduced dual path code. The source code includes, for instance, at least one common name usable in referencing analogous fields in different savearea layouts, which further reduces the need for dual path source code.

15 Claims, 8 Drawing Sheets fig. 1 fig. 2 fig. 3 fig. 4 fig. 5 fig. 6

COMMUNICATING BETWEEN PROGRAMS HAVING DIFFERENT MACHINE CONTEXT ORGANIZATIONS

TECHNICAL FIELD

This invention relates, in general, to communicating between programs of a computing environment, and in particular, to a linkage design that allows programs with different machine context organizations to communicate with one another.

BACKGROUND ART

Typically, one program will call another program in order to take advantage of the functionality of the other program. This enhances code reuse and reduces complexity of the calling program.

However, previously, in order for one program to communicate with another program, the programs had to be architecturally compatible. That is, they had to have compatible machine context organizations. For instance, if one program used 32-bit registers to save machine context information, then the other program had to similarly use 32-bit registers in order to retrieve and use the stored information.

More recently, strides have been made to enable programs having different machine context organizations to communicate with one another. In one example, in order to accomplish this, multiple source code generations are produced. One code generation is targeted to one architecture, while another code generation is targeted to a different architecture. This causes code duplication, increases maintenance costs, and increases the risk of either introducing or incompletely fixing errors.

Although some strides have been made to enable programs of differing architectures to communicate, there still exists a need for further enhancements to provide communication between programs having different machine context organizations.

SUMMARY OF THE INVENTION

Various shortcomings of the prior art are overcome and additional advantages are provided through the provision of a method of communicating between programs having different machine context organizations. The method includes, for instance, determining, at compile time, which savearea layout of a plurality of savearea layouts is to be used to save information relating to a calling program; and selecting, at compile time, a linkage service from a plurality of linkage services to be used in communicating between the calling program and a callee program.

In one embodiment, the determining of the savearea layout is based upon one or more attributes of the callee program. One such attribute is, for instance, the size of one or more registers used by the callee program. In a further embodiment, the determining is also based on a target architecture mode.

In a further aspect of the present invention, the determining and selecting enables the provision of a source code that has at least one of the following: a reduced amount of dual path source code, natural parameter passing to/from a variety of caller types, and natural exploitation of a large architecture, where desired. The source code further comprises at least one common name usable in referencing one or more analogous fields in at least two savearea layouts of the plurality of savearea layouts to reduce dual path source code.

System and computer program products corresponding to the above-summarized methods are also described and claimed herein.

Advantageously, in one aspect of the present invention, multiple versions of object code can be produced from the same source code. Much of the source code is common, with just a portion of the code being different to support the different versions. Additionally, source code for many programs in the system can remain unchanged, if they do not need to exploit the new architecture. This is particularly useful when coding in assembler language, which requires the programmer to deal with linkage and savearea conventions.

To enable the use of a common source code, the selection of a savearea layout and of a linkage service is performed at compile time. Further, fields that are common to multiple savearea layouts are referred to by a common name, which advantageously reduces the dual path source code that is needed. The present invention enables the coexistence of different savearea formats within a single compiled object code system.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with aspects of the present invention, a communications capability is provided which enables at least two programs (or modules) having differing machine context organizations to communicate with one another. The machine context organization includes, for instance, the size of the registers, the set of assembler instructions known to be available, the setup/format of the program status word (PSW), and/or limits on addressable storage.

The communications capability pertains generally to a set of compatible architectures, e.g., a small architecture and a large architecture, which is upward compatible with the small architecture. The small architecture uses short registers, and the large architecture uses long registers, which are high-order extensions of the short registers in the small architecture (which are also addressable as short registers in the large architecture, for upward compatibility). The short registers are equivalent to the low-order portions of the long registers.

Figure 1:
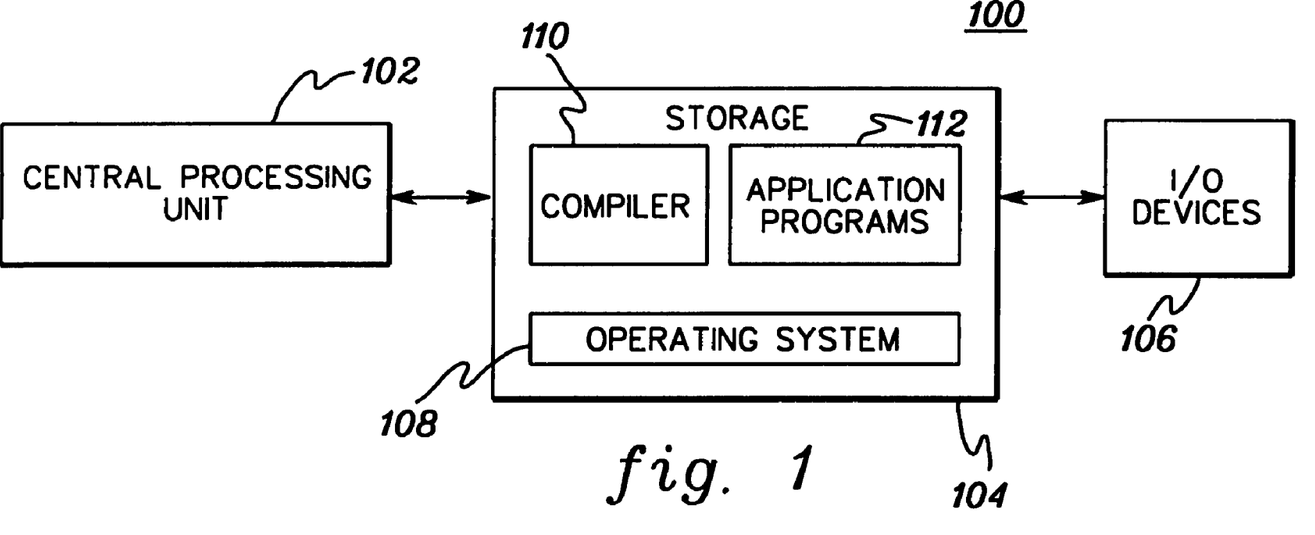
FIG. 1 depicts one example of a computing environment incorporating and using the communications capabilities of the present invention.

One example of a computing environment incorporating and using the communications capability of the present invention is depicted in FIG. 1. A computing environment 100 is based, for instance, on the Enterprise Systems Architecture ESA/390 offered by International Business Machines (IBM) Corporation, Armonk, N.Y., as well as extensions thereto. In particular, computing environment 100 supports, in accordance with an aspect of the present invention, multiple architectures, including a short register architecture, and a long register architecture, as well as appropriate instructions to manipulate the architectures. ESA/390 is described in an IBM publication entitled "Enterprise Systems Architecture/390 Principles Of Operation," IBM Publication No. SA22-7201-06, July 1999, which is hereby incorporated herein by reference in its entirety.

Computing environment 100 includes, for example, at least one central processing unit 102, a main storage 104 and one or more input/output devices 106, each of which is described below.

As is known, central processing unit 102 is the controlling center of computing environment 100 and provides the sequencing and processing facilities for instruction execution, interruption action, timing functions, initial program loading and other machine related functions. The central processing unit executes at least one operating system 108 (e.g., VM/ESA offered by International Business Machines Corporation), which is used to control the operation of the computing environment by controlling execution of other programs, controlling communication with peripheral devices and controlling use of the computer resources.

Central processing unit 102 is coupled to main storage 104, which is directly addressable and provides for high-speed processing of data by the central processing unit(s). Main storage 104 may be either physically integrated with the CPU(s) or constructed in stand-alone units. In one example, resident within main storage 104 are operating system 108, a compiler 110 and one or more applications programs 112.

Main storage 104 is also coupled to one or more input/output devices 106. These devices include, for instance, keyboards, communications controllers, teleprocessing devices, printers, magnetic storage media (e.g., tape, disks), direct access storage devices, and/or sensor based equipment. Data is transferred from main storage 104 to input/output devices 106, and from the input/output devices back to main storage.

During processing of an application program (or other type of program), the program may have occasion to call another program. Thus, the programs need to be able to communicate with one another, even if the calling program and callee program have different machine context organizations. In particular, the callee may need to be able to access and change the caller's register state in order to receive input parameters and to return results. In order for programs to communicate with one another, a linkage design is utilized that provides correct linkage between the programs. In one instance, the design includes a program attribute table, which lists various programs and their associated attributes. In one embodiment, the table is created and consulted at compile time. (As used herein, compile includes, but is not limited to, assemble). In particular, the program attribute table is, for instance, coded as a series of macros, which expand at compile time to record the attributes. Call, entry, and exit macros may then be executed at compile time to consult this table and generate code based on the attributes of the caller and callee and on the target architecture mode.

Figure 2:
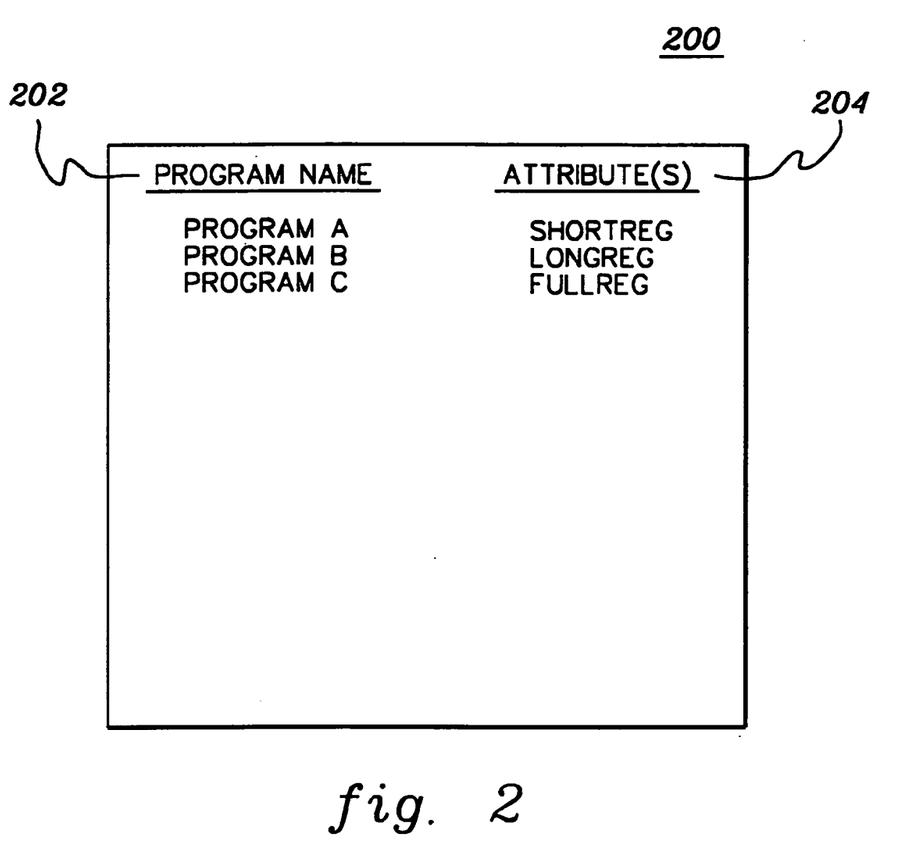
FIG. 2 depicts one embodiment of a program attribute table employed in one aspect of the present invention.

One example of a program attribute table 200 is depicted in FIG. 2 and described herein. Program attribute table 200 includes one or more programs 202 listed by an identifier, such as a name, and one or more attributes 204 associated with each program 202. One attribute provided is an indication of the width of the registers used by the program. This attribute has, for example, one of the following values: shortreg indicating the program uses short registers (e.g., 32 bit registers) and is restricted to using comparable sized instructions; longreg indicating the program uses long registers (e.g., 64-bit registers); fullreg indicating the program uses the full size of the registers available. If longer registers are available, then the program becomes a longreg program. On the other hand, if only shorter registers are available, then the program becomes a shortreg program.

This attribute is employed, for instance, in determining which of a plurality of saveareas (e.g., storage) is to be used to hold information, including, for example, register contents, relating to a calling program when it calls a callee program. This information includes register content/machine context information used to restore the employed registers, upon return from the called or callee program, so that the calling program can continue to run as if the callee program did not change or use the registers (with the exception of values intentionally returned by the callee, which in one embodiment are returned by storing into the savearea).

In one embodiment, the savearea locations containing the register values are referred to by name in the source code. For instance, a callee uses a single named mapping (structure) to refer to the fields in the savearea. As an example, a shortreg callee uses a SAVBK mapping (e.g., registers SAVER0-SAVER15), while a fullreg or longreg callee uses a SVGBK mapping (e.g., registers SVGR0–SVGR15, or their low-order portions referred to as SVGR0LO-SVGR15LO). In a small-architecture build (e.g., ESA/390), the block called SVGBK has a physical layout similar to SAVBK. This allows a fullreg callee to use SVGBK names for the fields in the source code, which is common across builds (i.e., across a small architecture build (e.g., ESA/390) and a large architecture build (e.g., an extension to ESA/390 to accommodate large registers)).

Figure 3:
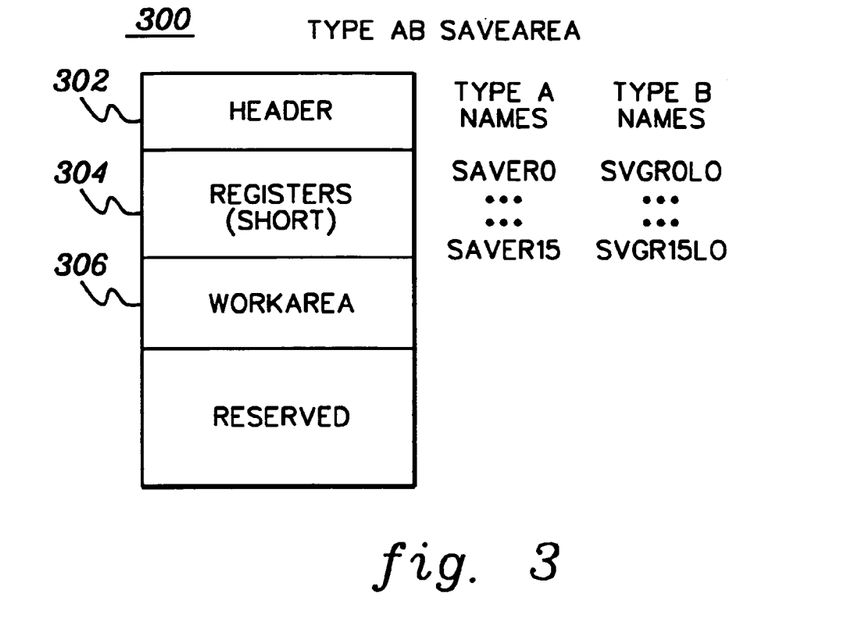
FIG. 3 depicts one example of a Type AB savearea layout used in accordance with the principles of the present invention.

Based on the attribute of the callee and/or the caller, there are three possible savearea layouts, in one embodiment. One type of savearea layout 300 is described with reference to FIG. 3. Savearea layout 300 (referred to herein as Type AB Savearea) is used when the caller and callee employ short registers. It includes, for example, a header 302 providing information relevant to the savearea and/or caller/callee; a plurality of short registers 304 for storing information; and a work area 306 for use by the callee as temporary storage. For the Type AB Savearea, Type A refers to a shortreg callee's view, and Type B refers to a fullreg callee's view in the small architecture build.

Figure 4:
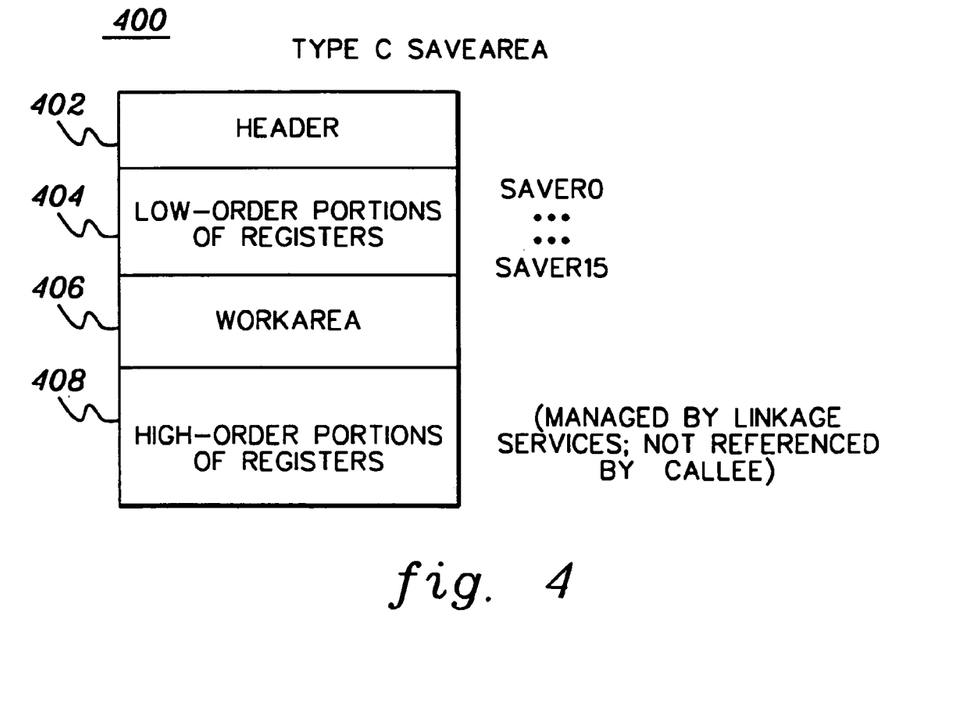
FIG. 4 depicts one embodiment of a Type C savearea layout used in accordance with the principles of the present invention.

Another type of savearea layout 400 (referred to herein as Type C Savearea) is used when the caller attribute is longreg or fullreg in the large architecture build, but the callee attribute is shortreg. This type of savearea layout includes a header 402; low-order registers 404 (e.g., registers SAVER0-SAVER15), a work area 406; and high-order registers 408. In one example, the high-order registers are managed by linkage services and are not referenced by the callee program.

Figure 5:
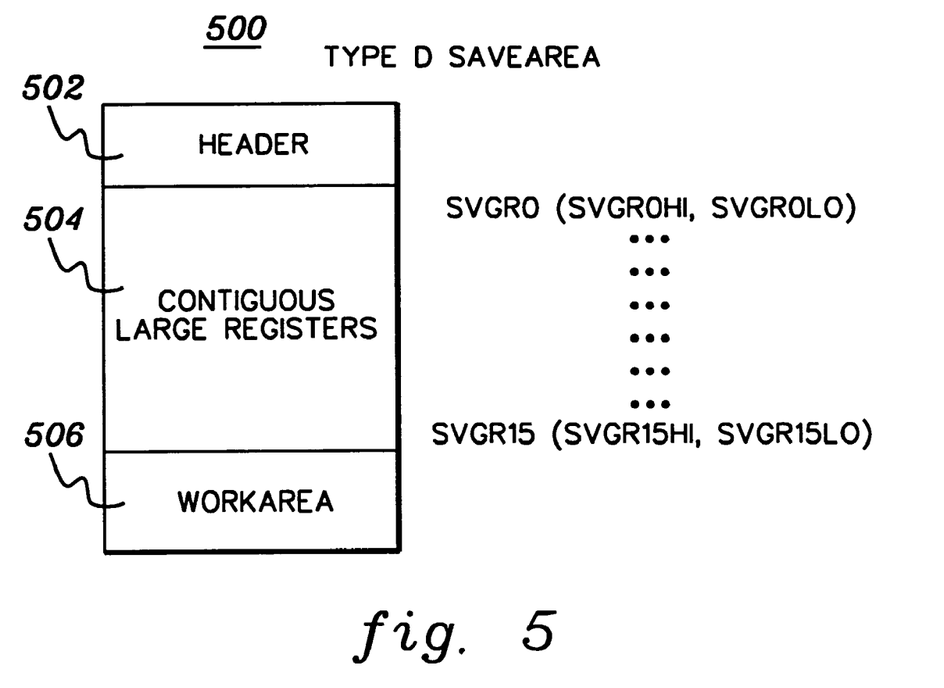
FIG. 5 depicts one embodiment of a Type D savearea layout used in accordance with the principles of the present invention.

A further type of savearea layout 500 (FIG. 5) (referred to herein as the Type D Savearea) is used when the callee's attribute is longreg or fullreg in the large architecture build, and the caller's attribute is any of the possibilities. Savearea layout 500 includes, for instance, a header 502; a set of contiguous large registers 504 (e.g., registers SVGR0HI/SVGR0LO through SVGR15HI/SVGR15LO) and a work area 506. It should be noted that, in this embodiment, Type B Savearea and Type D Savearea can be referenced using common names for fields present in both savearea layouts. For instance, in the SVGBK, the same name is used for the entire (short) register in Type B as for the low-order portion of the large register in Type D.

The provision of an attribute that indicates the width of the registers used by a program and the provision of various savearea layouts enable the communications linkage between a caller program and a callee program to be determined at compile time. This is due, at least in part, to the static nature of the attributes of the programs.

One embodiment of the logic run at compile time to classify the type of linkage service needed is described with reference to FIG. 6. As described below, the linkage service is selected based on the architecture mode for which the program is being compiled (e.g., large or small) and the attributes of the caller and callee. As examples, this logic may be included within a compiler, or within macro logic contained in the source code for an operating system, application program or elsewhere.

Figure 6:
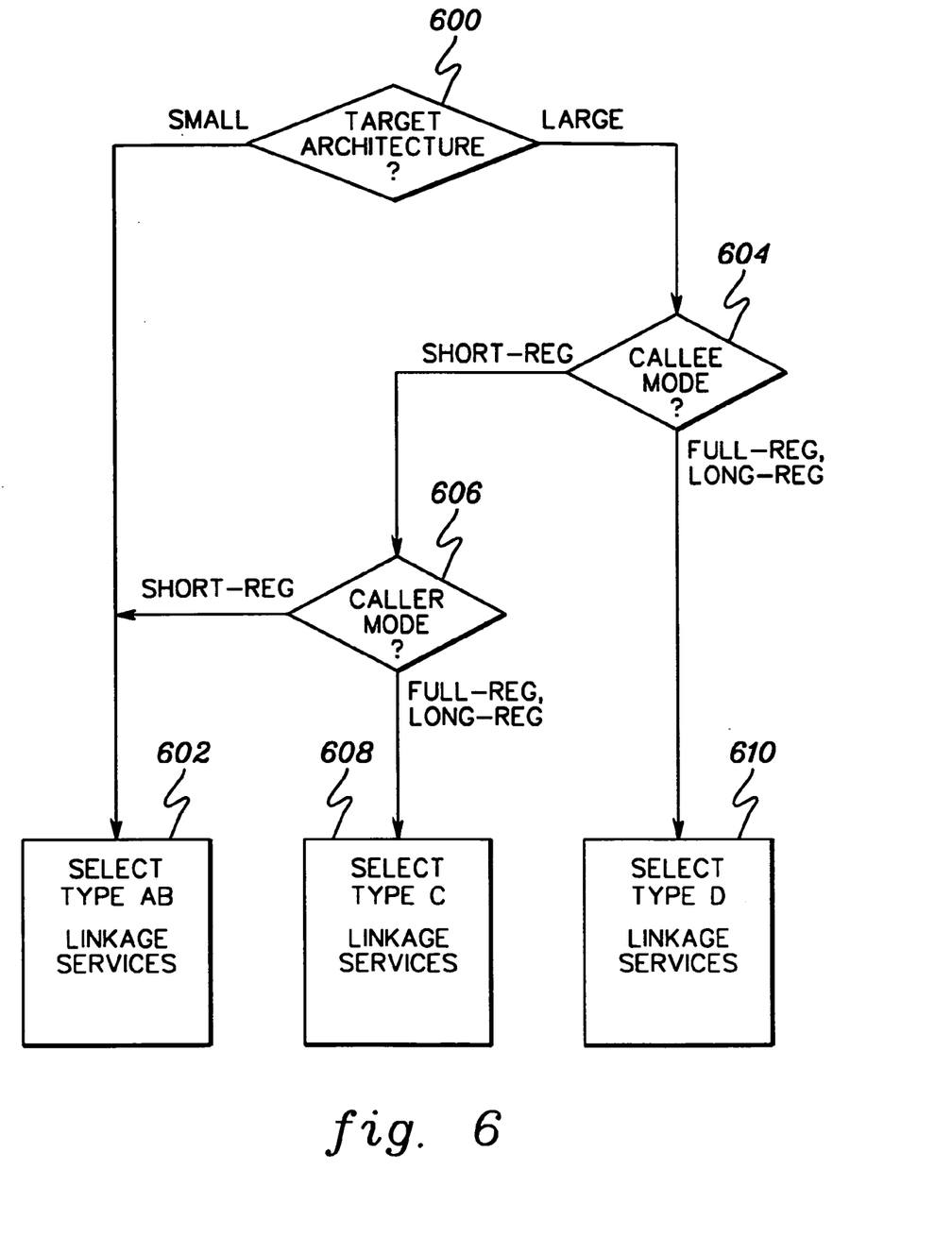
FIG. 6 depicts one embodiment of the logic associated with determining the type of linkage services to be employed to communicate between programs, in accordance with the principles of the present invention.

Referring to FIG. 6, initially, a determination is made as to whether the target architecture is a small architecture (e.g., 32-bit) or a large architecture (e.g., 64-bit), INQUIRY 600. If the target architecture is a small architecture, then a savearea having short registers (see FIG. 3) is used and the linkage service corresponding to the shortreg attribute is selected for saving and restoring register contents, STEP 602. This linkage service is referred to herein as Type AB, which corresponds to Type AB savearea layout and is further described below. (As is known, registers in a savearea refers to register values or contents relevant to a particular context (point of execution, e.g., at the point a caller invokes a callee) residing in the savearea).

However, if the target architecture is a large architecture, INQUIRY 600, then a further determination is made as to the attribute of the callee, INQUIRY 604. If the callee's attribute is short registers, then a further determination is made as to the caller's attribute, INQUIRY 606. If the caller's attribute is also short registers, then once again Type AB savearea layout and linkage service is selected, STEP 602. On the other hand, if the callee mode is short registers, but the caller mode is full registers or long registers, then a Type C linkage service is selected, which is described below, STEP 608.

Returning to INQUIRY 604, when the callee's attribute is full registers or long registers, then a Type D linkage service is selected, regardless of the caller's mode, STEP 610. This type of linkage service corresponds to the Type D savearea layout.

The different types of linkage services are described in further detail with reference to FIGS. 7a–7c and FIGS. 8a–8c. In particular, the calling linkage services in which information is saved in the designated registers of the savearea are described with reference to FIGS. 7a–7c, and the returning linkage services in which information is restored are described with reference to FIGS. 8a–8c. In one embodiment, compile-time logic selects one of the calling linkage services of FIGS. 7a–7c to be executed at run time to perform the call, and that selected logic in turn determines the corresponding return linkage service from FIGS. 8a–8c to be executed at run time to perform the return.

Figure 7A:
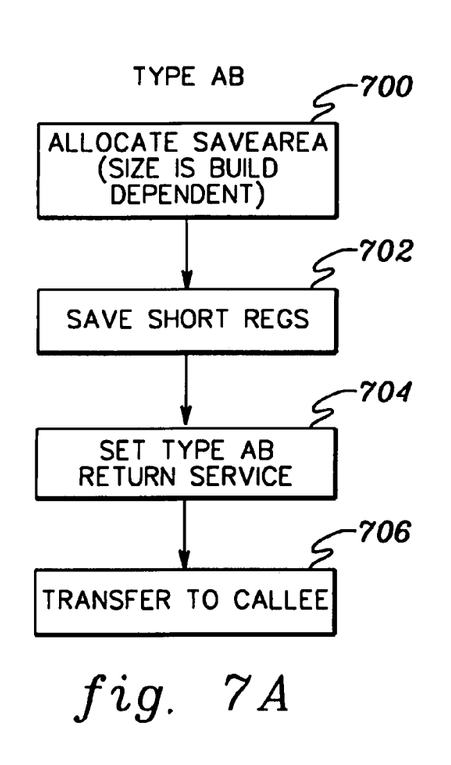
FIGS. 7a–7c depict examples of implementing calling linkage services, in accordance with the principles of the present invention.

Referring to FIG. 7a, the calling linkage service for Type AB is described. The calling linkage service is responsible for saving the caller's state in the corresponding savearea and passing control to the callee.

Initially, the savearea is allocated, STEP 700. The size of the savearea is dependent on the source generation being produced. The process of allocating a savearea may simply involve adjusting a stack pointer, or it may be a more complex operation requiring use of some registers. In the latter case, as is common in the art, the caller's values in those registers may be staged into a fixed storage area private to this instantiation of the linkage service, and may then be transcribed from the fixed area into the savearea after the allocation is complete. Registers not needed to perform the allocation may be saved directly into the savearea.

After allocating the savearea, the short registers are saved in the savearea, STEP 702, and the return service is set to Type AB, STEP 704. In one embodiment, a pointer to this return service is stored in the header of the savearea.

This allows the proper type of return service for this savearea format to be invoked from generic exit logic in the callee. For example, a shortreg callee will automatically use a Type AB return service when returning to a shortreg caller, but a Type C return service when returning to a longreg caller. Subsequently, control transfers to the callee program, STEP 706.

Figure 8A:
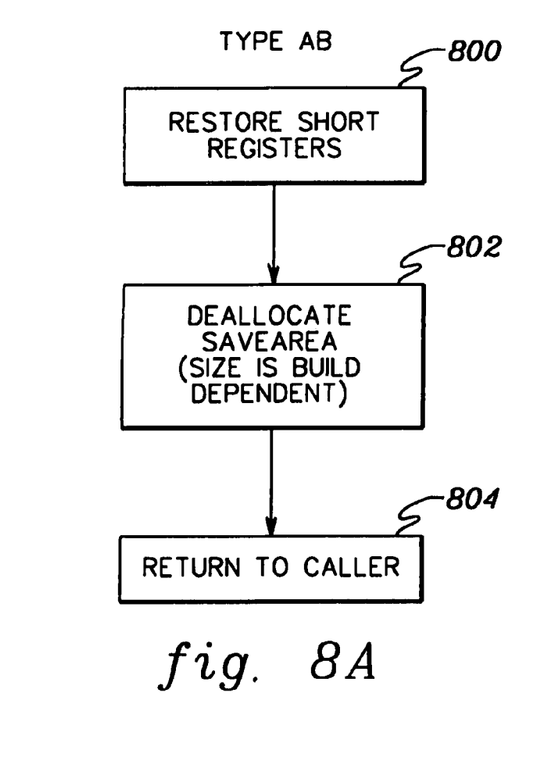
FIGS. 8a–8c depict examples of implementing return linkage services, in accordance with the principles of the present invention.

The return linkage service for Type AB is described with reference to FIG. 8a. The return service is responsible for restoring the caller's state and passing control back to the caller. The return service, in one embodiment, uses the return service information stored in the header of the savearea in performing the transfer.

In one implementation, the short registers of the savearea are restored, STEP 800. Thereafter, the savearea is deallocated, STEP 802, and the logic returns to the caller, STEP 804. The process of deallocating a savearea may simply involve adjusting a stack pointer or it may be a more complex operation requiring use of some registers. In the latter case, as is common in the art, the values to be restored for the caller in those registers may be staged into a fixed storage area private to this instantiation of the linkage service, and may then be restored from the fixed area after the deallocation is complete. Registers not needed to perform the deallocation may be restored directly from the savearea.

Figure 7B:
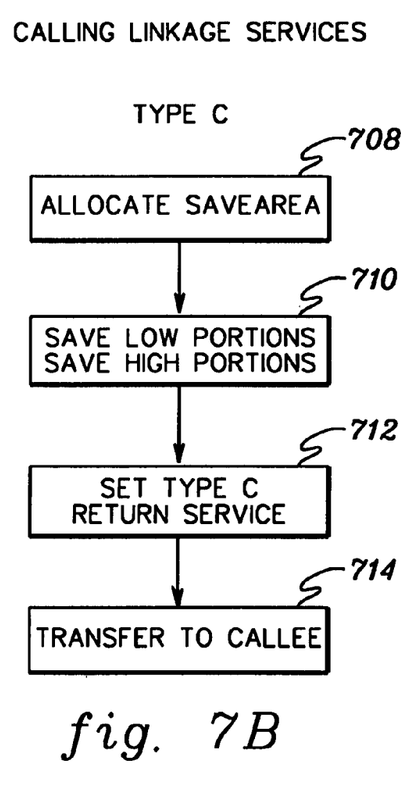

Referring to FIG. 7b, the calling linkage service for Type C is described. (The Type C linkage service corresponds to the Type C savearea layout depicted in FIG. 4.) Initially, a savearea of the appropriate size is allocated, STEP 708, and then the low-order registers (e.g., SVGR0LO-SVGR15LO) are saved in the savearea, as well as the high-order registers (e.g., SVGR0HI-SVGR15HI), STEP 710. Thereafter, the return service is set to Type C in the header of the Type C savearea, STEP 712, and control transfers to the callee, STEP 714.

Figures 8B, 8C:
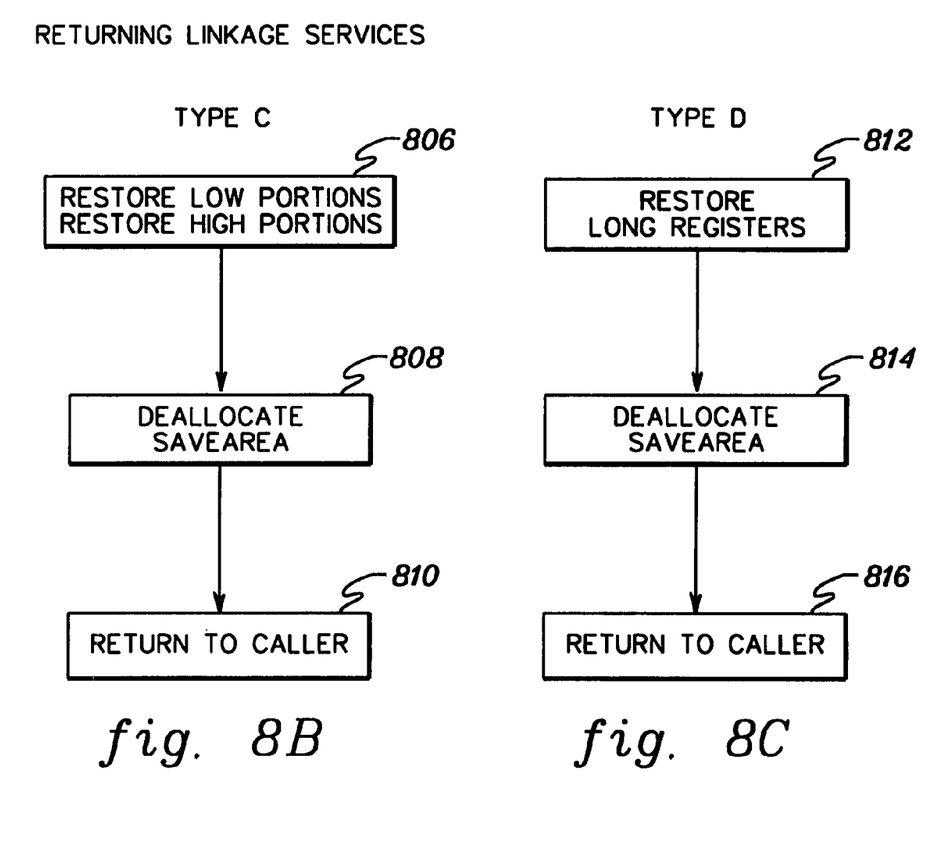

Referring to FIG. 8B, the return linkage service for Type C is described. Initially, the low halves and high halves of the savearea registers are restored, STEP 806, and then the savearea is deallocated, STEP 808. Thereafter, control returns to the caller, STEP 810.

The Type C layout and linkage service is for the case of a longreg caller (or fullreg in the large architecture) invoking a shortreg callee. In principle, the shortreg callee should not disturb the caller's state in the high halves of the registers that need to be saved. However, in one embodiment, the high halves are saved and restored for several reasons:

1) It avoids a rework of context-switching (thread-switching) logic to save the high halves, provided that all such logic remains in shortreg callees. By saving the complete registers on a long-to-short transition, it is ensured that they are captured before the shortreg context switcher can lose them.
2) It tolerates "scratch" usage of the high halves in shortreg routines. Such a routine takes care not to assume that the high halves are preserved across a downward call; however, a longreg callee to this routine will not have its state corrupted by this activity.
3) It ensures that the complete state of a longreg callee is captured in one place, which assists problem diagnosis. By contrast, if the high halves on a long-to-short transition were not saved, then the diagnostician would have to reconstruct an ancestral longreg routine's state from high halves and low halves in different saveareas or perhaps from high halves still in the machine registers and low halves in a distant savearea.

In other embodiments, the high halves may not be saved.

Figure 7C:
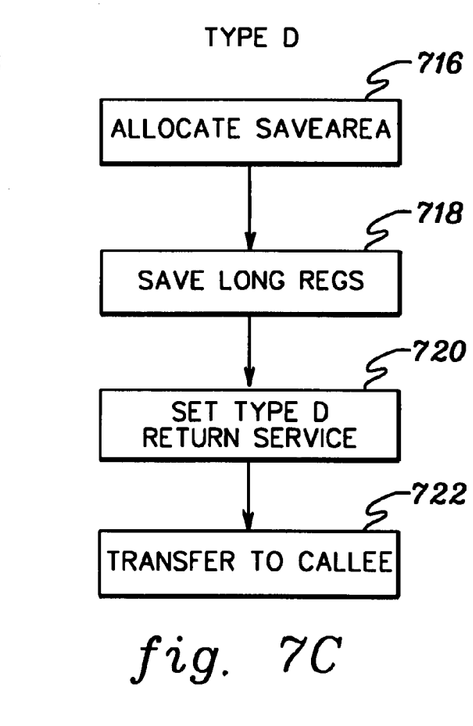

Referring to FIG. 7C, the calling linkage service for Type D is described. (The Type D linkage service corresponds to the Type D savearea layout depicted in FIG. 5.) Once again, a savearea of the appropriate size is allocated, STEP 716, and then the long registers (e.g., SVGR0HI/SVGR0LO through SVGR15HI/SVGR15LO) are stored contiguously in the savearea, STEP 718. Thereafter, the return service is set to Type D in the savearea header, STEP 720, and control transfers to the callee, STEP 722.

In order to restore the Type D savearea, the long registers are restored, STEP 812 (FIG. 8c), and the savearea is deallocated, STEP 814. Subsequently, control returns to the caller, STEP 816.

The above-described capability allows the use of multiple savearea layouts in, for example, a single product. In particular, different savearea layouts for different callees are provided within the same version of a product (e.g., the collection of object code produced for execution in a single target architecture). Only one source code is needed to run the different savearea layouts. The source code selects the desired savearea layout based on the architecture and/or the caller/callee mode.

In accordance with one aspect of the present invention, a full register attribute of a program is supported, which enables support of both short and long registers, depending on the architecture. Thus, large registers and new op codes are exploited if desired, while interface capability and support are maintained for shortreg callers. A common source code is employed for the different target architecture object programs. In particular, the use of a common, single source code is maximized, while also enabling target architecture specific code where desired to support new architecture, via conditional compilation logic.

The fullreg capability allows common savearea field naming across different physical savearea layouts (e.g., savearea layouts Type AB and Type D) to accommodate the production of the appropriate object code for each architecture from common source code. In particular, a callee uses a single named mapping structure to refer to the fields in the savearea. This structure is referred to in the examples as SVGBK. In the small architecture build, the block which is called SVGBK actually has a physical layout similar to SAVBK. This allows a fullreg callee to use SVGBK names for the fields in source code, which is common across both builds. The compiler (or assembler) resolves this to the appropriate locations, which may be at different offsets in each build, for the layout used in each build.

Figure 9:
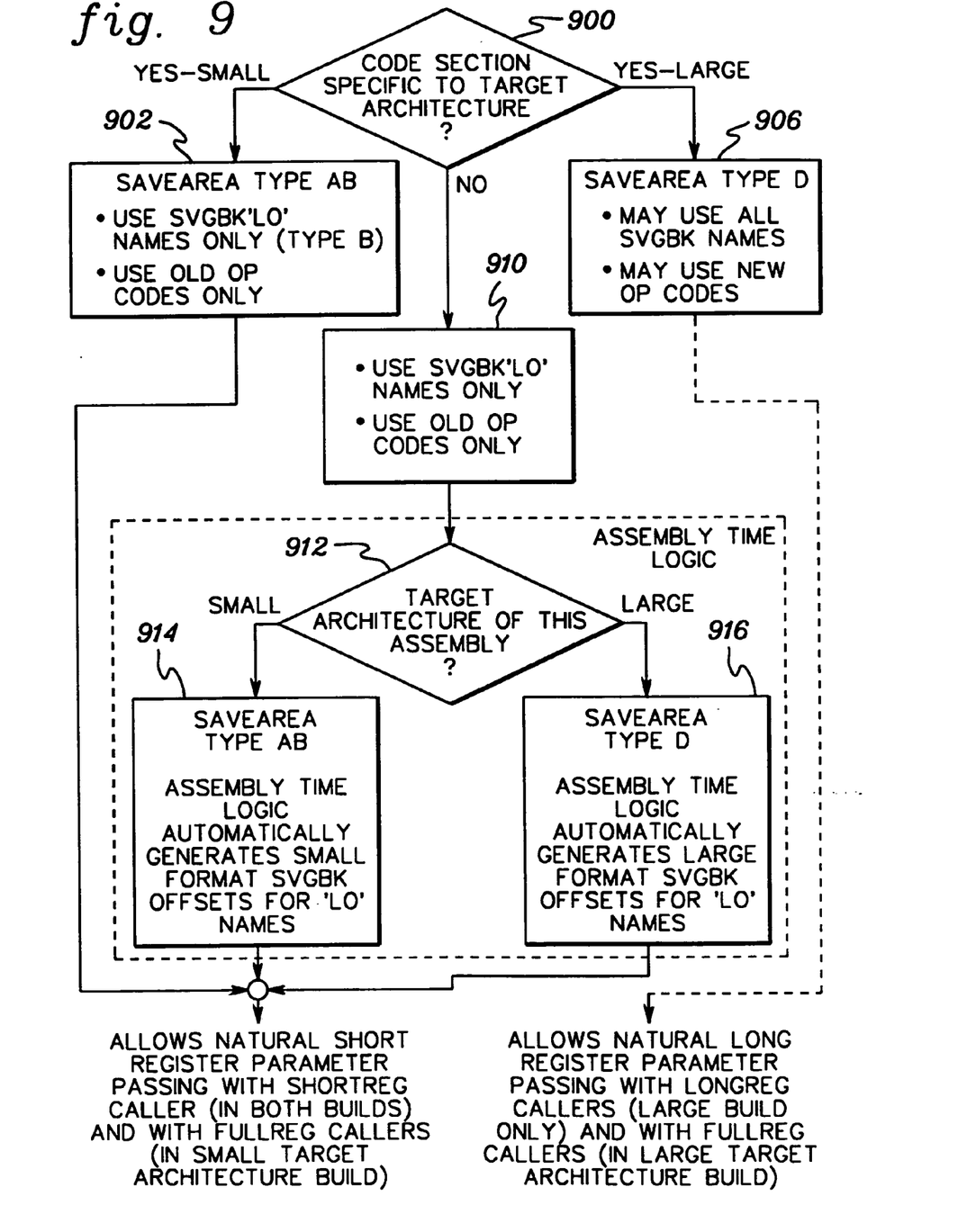
FIG. 9 depicts one embodiment of the logic associated with employing a full register capability of the present invention.

One embodiment for employing the fullreg capability of one aspect of the present invention is described in detail with reference to FIG. 9. The steps of this diagram are typically performed by a programmer when writing different portions of code, except for the area labeled assembly time logic, which is performed by a computer.

Initially, a determination is made as to whether the particular code section being written is specific to a target architecture, INQUIRY 900. If it is specific to a small architecture, then the chosen savearea layout is Type AB.

Although the savearea layout is Type AB, the Type B names (SVGBK) are used. In particular, since this is a small architecture, the SVGBK 'LO' names are used. Further, the old op codes are used. This allows natural short register parameter passing with shortreg caller (in both builds), and with fullreg caller in the small target architecture build.

Returning to INQUIRY 900, if the code section is specific to a large target architecture, then the savearea layout selected is Type D, STEP 906. Since this is the large architecture, all of the SVGBK names may be used, as well as new op codes. This allows natural long register parameter passing with longreg callers (large build), and with fullreg callers in the large target architecture build.

If, however, the code section is not specific to the target architecture, INQUIRY 900, then the SVGBK 'LO' names are used, as well as the old op codes, STEP 910. Additionally, a determination is made as to the nature of the target architecture of this assembly, STEP 912. If the target architecture is small, then the selected savearea layout is Type AB. The compile time logic automatically generates small format SVGBK offsets for the 'LO' names, STEP 914. Again, this allows natural short register parameter passing with shortreg callers.

Returning to INQUIRY 912, if, however, the target architecture of this compilation is large, then the selected savearea layout is Type D, STEP 916. Thus, the compile time logic automatically generates large format SVGBK offsets for the 'LO' names. This allows short register parameter passing with all callers in both builds.

The various coding modes described herein (e.g., architecture independent, small-only, large-only) may be combined into a single program. For example, a program may use a shortreg-style interface for exchanging information with its caller, so as to accommodate all types of callers, but may use longreg-style logic internally for its computations, and in invoking other programs.

Further details associated with the fullreg capability of the present invention are illustrated below with the following assembly code fragments:

Code Example 1: Assuming "common" (upwardly compatible from old/shortreg code; also usable from new fullreg and longreg code) interface parameter in R1 from caller:

L R1,SVGR1LO
SVGR1LO resolves to Type B layout offset for small target architecture build, but to Type D layout offset (right portion of SVGR1) for the large target architecture build.

Code Example 2: Assuming architecture specific parameter (32 bit in small target architecture build, 64 bit in large target architecture build) in R2 from caller:

AIF (&ARCHSMALL)
Small target architecture build only code:
L R2,SVGR2LO
SVGR2LO resolves to Type B layout offset because this code is only generated in the small architecture build.

AELSE (&ARCHLARGE)
Large target architecture build only code:
"Load-long" R2,SVGR2
Load 64 bit wide Register 2 from 64 bit wide field SVGR2 using an operation specific to the large architecture. SVGR2 resolves to Type D layout offset because this code is only generated in the large architecture build.

AEND (&ARCHSMALL+&ARCHLARGE)

Code Example 3: Assuming a flexible input parameter in R3, so that the routine may be called naturally with 32 bit parameter in the small target architecture build, and with either a 32 bit or 64 bit parameter, depending on the register style capabilities and preferences of the calling routine, in the large target architecture build. This fullreg technique allows service routines to be written which can be called by unchanged shortreg routines in both builds, and also by longreg/fullreg routines in the large target architecture build, with natural register parameter interfaces in all cases. (Note: In the large target architecture, the selection between the two parameter widths is done, for instance, by a parameter option bit specified in a different register parameter, which is a 32 bit parameter in both builds, such as demonstrated in Code Example 1.)

The Example 3 code is as follows:

AIF (&ARCHSMALL)
Small target architecture build only code:
L R3,SVGR3LO
SVGR3LO resolves to Type B layout offset because this code is only generated in the small architecture build.

AELSE (&ARCHLARGE)
Large target architecture build only code:
Test parameter option bit in R1 to determine whether caller passed small or large R3 parameter
TM SVGR1LO,R3PARMLARGE
Is R3 input parameter large?
BO R3LARGE
"Load-long-from-short" R3,SVGR3LO
Load 64 bit wide Register 3 from 32 bit wide field SVGR3LO using an operation specific to the large architecture, which converts a 32 bit operand to 64 bits and loads it into a 64 bit register. SVGR3LO resolves to Type D layout offset because this code is only generated in the large architecture build.

B HAVER3
Rejoin common code at label HAVER3.
R3LARGE EQU *
"Load-long" R3,SVGR3
Load 64 bit wide Register 3 from 64 bit wide field SVGR3 using an operation specific to the large architecture. SVGR3 resolves to Type D layout offset (only possibility, as field name SVGR3 does not exist in Type B layout)
HAVER3 EQU *

AEND (&ARCHSMALL+&ARCHLARGE)
At this point, R3 contains a 32 bit parameter value in the small build, or a 64 bit parameter value (possibly converted from a 32 bit input parameter value) in the large build. Further conditional assembly logic would be used to process the R3 parameter.

Described in detail above is a linkage design that enables programs having different machine context organizations to communicate with one another. In one example, the programs comprise a single executable module within a single computer; however, this is only one example, and the invention is not limited to such an example. The selection of the appropriate linkage services at compile time advantageously avoids more costly run-time testing in the call and return services.

This design advantageously allows shortreg programs to continue unchanged, while allowing all callees to use the savearea as desired, without knowing the attributes of the caller.

In summary, some advantages of the present invention include compile-time selection of linkage operations (through services) based on caller/callee attributes versus runtime testing; use of a finite number of predefined linkage services as opposed to a separate glue routine for each callee; use of single source to generate multiple object code in assembly language; and accommodation of register-intensive parameter-passing interfaces.

Although one example of a computing environment is described above, the invention is not limited to such an environment. The capabilities of the present invention can be incorporated and used with many types of computing environments, computing systems and/or platforms. The above are only offered as examples. For example, a computing environment having multiple systems, each having a different architecture, may employ aspects of the present invention.

The use of the word "program" herein includes a portion of a program, a module, a whole program and/or any code that is to communicate with any other code.

Further, although 32-bit registers and 64-bit registers are given as examples herein, the invention is not limited to such sizes. The invention is equally applicable to other architectural sizes.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of compiling to process a call from a calling program to a called program, said method comprising the steps of:

at compile time, comparing a register length of said calling program to a register length of said called program; and if said register length of said calling program is greater than said register length of said called program, at compile time, selecting a first linkage service program which assigns a first location to store a least significant portion of an entirety of register contents associated with said call and a second location to store a most significant portion of said entirety of register contents, saves said least significant portion at said first location and said most significant portion at said second location, passes to said called program an identity of said first location such that said called program will access and process said least significant portion but not said most significant portion, and invokes said called program, and at compile time, generating executable code to invoke said first linkage service program, and if said register length of said calling program is less than said register length of said called program, at compile time, selecting a second linkage service program which assigns a third location to store said entirety of register contents, saves said entirety of register contents at said third location, passes to said called program an identity of said third location such that said called program will access and process said entirety of register contents, and invokes said called program, and at compile time, generating executable code to invoke said second linkage service program.

2. A method as set forth in claim 1 wherein, at compile time, further comprising the step of generating an executable form of said first linkage service program and said second linkage service program.

3. A method as set forth in claim 1 wherein if said register length of said calling program is greater than said register length of said called program, said length of said least significant portion equals said length of registers of said called program.

4. A method as set forth in claim 1 wherein said compiling is assembling.

5. A method as set forth in claim 1 further comprising the step of executing at run time the selected linkage service program.

6. A compiling system to process a call from a calling program to a called program, said system comprising:

means, at compile time, for comparing a register length of said calling program to a register length of said called program; and means, responsive to said register length of said calling program being greater than said register length of said called program, at compile time, for selecting a first linkage service program which assigns a first location to store a least significant portion of an entirety of register contents associated with said call and a second location to store a most significant portion of said entirety of register contents, saves said least significant portion at said first location and said most significant portion at said second location, passes to said called program an identity of said first location such that said called program will access and process said least significant portion but not said most significant portion, and invokes said called program, and at compile time, for generating executable code to invoke said first linkage service program, and means, responsive to said register length of said calling program being less than said register length of said called program, at compile time, for selecting a second linkage service program which assigns a third location to store said entirety of register contents, saves said entirety of register contents at said third location, passes to said called program an identity of said third location such that said called program will access and process said entirety of register contents, and invokes said called program, and at compile time, for generating executable code to invoke said second linkage service program.

7. A system as set forth in claim 6 further comprising means, at compile time, for generating an executable form of said first linkage service program and said second linkage service program.

8. A system as set forth in claim 6 wherein if said register length of said calling program is greater than said register length of said called program, said length of said least significant portion equals said length of registers of said called program.

9. A system as set forth in claim 6 wherein said compiling is assembling.

10. A system as set forth in claim 6 further comprising means for executing at run time the selected linkage service program.

11. A computer program product for compiling to process a call from a calling program to a called program, said computer program product comprising:

a computer readable medium;

first program instructions, operable at compile time, to compare a register length of said calling program to a register length of said called program; and second program instructions, responsive to said register length of said calling program being greater than said register length of said called program, operable at compile time, to select a first linkage service program which assigns a first location to store a least significant portion of an entirety of register contents associated with said call and a second location to store a most significant portion of said entirety of register contents, saves said least significant portion at said first location and said most significant portion at said second location, passes to said called program an identity of said first location such that said called program will access and process said least significant portion but not said most significant portion, and invokes said called program, and operable at compile time, to generate executable code to invoke said first linkage service program, and third program instructions, responsive to said register length of said calling program being less than said register length of said called program, operable at compile time, to select a second linkage service program which assigns a third location to store said entirety of register contents, saves said entirety of register contents at said third location, passes to said called program an identity of said third location such that said called program will access and process said entirety of register contents, and invokes said called program, and operable at compile time, to generate executable code to invoke said second linkage service program; and wherein said first, second and third program instructions are stored on said medium.

12. A computer program product as set forth in claim 11 further comprising fourth program instructions, operable at compile time, to generate an executable form of said first linkage service program and said second linkage service program; and wherein said fourth program instructions are stored on said medium.

13. A computer program product as set forth in claim 11 wherein if said register length of said calling program is greater than said register length of said called program, said length of said least significant portion equals said length of registers of said called program.

14. A computer program product as set forth in claim 11 wherein said compiling is assembling.

15. A computer program product as set forth in claim 11 further comprising fourth program instructions to execute at run time the selected linkage service program; and wherein said fourth program instructions are stored on said medium.

* * * * *